United States Patent [19]

Strehler et al.

[11] 4,429,107
[45] Jan. 31, 1984

[54] CONTINUOUS PREPARATION OF POLYCAPROLACTAM WHEREIN CONSTANT COMPOSITION IS MAINTAINED

[75] Inventors: Hugo Strehler, Frankenthal; Werner Hoerauf; Guenter Valentin, both of Ludwigshafen; Friedrich Urbanek, Schifferstadt, all of Fed. Rep. of Germany

[73] Assignee: BASF Aktiengesellschaft, Fed. Rep. of Germany

[21] Appl. No.: 410,880

[22] Filed: Aug. 24, 1982

[30] Foreign Application Priority Data

Sep. 2, 1981 [DE] Fed. Rep. of Germany ....... 3134716

[51] Int. Cl.$^3$ ............................................. C08G 69/16
[52] U.S. Cl. .................................... 528/318; 526/67; 526/68; 526/69; 528/323
[58] Field of Search .................. 528/318, 323; 526/67, 526/68, 69

[56] References Cited

U.S. PATENT DOCUMENTS 2,908,666 10/1959 Notarbartolo ...................... 528/318
3,565,866 2/1971 Guenther et al. ................... 528/318
4,204,049 5/1980 Matthies et al. .................... 528/318

FOREIGN PATENT DOCUMENTS 1113357 5/1968 United Kingdom .

Primary Examiner—Harold D. Anderson
Attorney, Agent, or Firm—Keil & Witherspoon

[57] ABSTRACT

An improved process for the continuous preparation of polycaprolactam, in which $\epsilon$-caprolactam is partially polymerized, with the addition of a water-containing agent and acetic acid or propionic acid as a chain regulator, at a nylon-forming temperature, in a mechanically mixed zone in a vertical tubular reactor through which the reaction mixture flows downwards, and is then polymerized further, in additional heat exchange zones, until the desired degree of polymerization is reached, and polycaprolactam is then discharged as a melt, wherein a gaseous mixture of caprolactam, water and acetic acid or propionic acid is removed at the top of the tubular reactor and is fed to the middle of a column, water is removed at the top of the column, the bottom of the column is maintained at from 125° to 145° C., and the mixture obtained at the bottom of the column, and comprising caprolactam, acetic acid or propionic acid and a small amount of water, is recycled to the top of the tubular reactor.

2 Claims, No Drawings

CONTINUOUS PREPARATION OF POLYCAPROLACTAM WHEREIN CONSTANT COMPOSITION IS MAINTAINED

Industrially, polycaprolactam is prepared by polymerizing caprolactam at from 240° to 300° C. in polymerization tubes, referred to as precondensation tubes, which may or may not be subdivided into zones. Considerable endeavors have been made to improve and modify the polymerization process.

German Published Application DAS No. 1,495,198 discloses a process in which the lactam melt is passed into a polymerization tube of which the top quarter has a larger diameter than the remaining part of the polymerization tube, the lactam melt is substantially polymerized in the top quarter, while stirring, and the polylactam melt is then cooled by means of the reversible heat exchangers located in the remaining part of the tube, so that the temperature in the last quarter of the cylindrical tube is only slightly above the solidification point of the polycaprolactam. Although this process overcomes the difficulties which arise when admixing water-containing additives at the top of the precondensation tube, it is necessary to discharge the added water from the polymerization zone, without losses of caprolactam and chain regulators, such as acetic acid, resulting. According to Klare, Synthetische Fasern aus Polyamiden (Akademie-Verlag Berlin 1963, page 82), the excess vapor is allowed to escape via a line into a condensation vessel, and the entrained caprolactam vapor is obtained by evaporating down the condensate. Such a procedure is technically complicated and does not ensure constant composition of the polymerizing melt during a continuous polymerization.

German Laid-Open Application DOS No. 2,732,328 also discloses that the vapor mixture removed from the top of the precondensation tube can be fractionated. However, this process requires improvement in order to ensure constant composition of the recycled material and therefore of the polymerizing melt. Fluctuations produce, in particular, polymers which exhibit variations in respect of their dyeability.

It is an object of the present invention, when caprolactam is polymerized in a vertical tubular reactor, to discharge the water introduced with the starting materials in such a manner that no losses of caprolactam and chain regulators occur, the polymerizing melt has a constant composition, and variations in the dyeability of the polymer are avoided.

We have found that this object is achieved by a process for the continuous preparation of polycaprolactam, in which ε-caprolactam is partially polymerized, with the addition of a water-containing agent and acetic acid or propionic acid as a regulator, at a nylon-forming temperature, in a mechanically mixed zone in a vertical tubular reactor through which the reaction mixture flows downwards, and is polymerized further, in additional heat exchange zones, until the desired degree of polymerization is reached, polycaprolactam is then discharged as a melt, and water vapor, and caprolactam present therein proportionately to its partial vapor pressure, are removed and fractionated, wherein a gaseous mixture of caprolactam, water and acetic acid or propionic acid is removed at the top of the tubular reactor and fed to the middle of a column, water is removed at the top of the column, the bottom of the column is maintained at from 125° to 145° C., and the mixture obtained at the bottom of the column, and comprising caprolactam, acetic acid or propionic acid, and a small amount of water, is recycled to the top of the tubular reactor.

The novel process has the advantages that the water introduced into the precondensation tube together with the starting materials is discharged without difficulty, that at the same time no losses of caprolactam and chain regulators occur, that the polymerizing caprolactam melt has a constant composition, and in particular that caprolactam and oligomer-containing aqueous solutions which are produced in the extraction of polycaprolactam can be employed without prior concentration, or with only partial prior concentration, thereby avoiding difficulties arising from the precipitation of oligomers.

The polymerization is carried out in a vertical tubular reactor through which the reaction mixture flows downwards; this type of tubular reactor has frequently been described, under the name precondensation tube, in the literature. In the first mechanically mixed reaction zone, which accounts for from about 25 to 40% of the volume of the tubular reactor, partial polymerization takes place, with from about 20 to 70% conversion of the caprolactam melt to polymer. The caprolactam is advantageously introduced in the molten state into this first zone, and brought to a nylon-forming temperature, preferably from 240° to 295° C., by means of heat exchangers, for example heating coils. The further polymerization, to give the desired degree of polymerization, takes place in one or more downstream heat exchange zones in the tubular reactor. These are advantageously maintained at from 240° to 300° C. The molten polycaprolactam is discharged, for example, via screw pumps or gear pumps. The polymer is then taken off as a ribbon or filament, and granulated. For example, a suitable process is described in German Published Application DE-AS No. 1,495,198.

The polymerization is carried out under atmospheric or slightly superatmospheric pressure, for example from 1.02 to 3 bar. The numerical values of the pressure relate to the vapor space above the first reaction zone. In the melt, the pressure at any point is increased by the hydrostatic pressure of the liquid column above this point. From 0.05 to 0.5% by weight, based on the caprolactam employed, of acetic acid or propionic acid, as a regulator, is introduced together with the molten caprolactam.

In addition, a water-containing agent is introduced together with the fresh caprolactam, and for the purposes of the invention this agent contains from 5 to 95% by weight of water. Examples of such additives are aqueous suspensions or solutions of pigment dyes, stabilizers or antistatics, which as a rule contain from 5 to 15% by weight of the stated substances.

Water-containing agents are also to be understood as meaning aqueous solutions of caprolactam and of its oligomers, which are obtained in the extraction of polycaprolactam. Such extraction liquors contain, for example, from 5 to 20% by weight of caprolactam and its oligomers, and may be concentrated, before use, to 70% strength by weight. The amount of water fed in may be, according to the invention, not more than 200% by weight, based on freshly introduced caprolactam.

At the temperature employed, the water introduced with the starting materials is vaporized immediately, and a vaporous mixture of water, caprolactam and acetic acid or propionic acid is produced in the gas space above the first reaction zone. In accordance with the invention, this vaporous mixture, which contains, for example, from 70 to 90% by weight of caprolactam, from 10 to 30% by weight of water and from 0.1 to 0.5% by weight of acetic acid or propionic acid, is removed at the top of the tubular reactor and fed to the middle of a column. Examples of suitable columns are packed columns, sieve-tray columns and bubble-cap columns, advantageously having from 3 to 10 theoretical plates. The total amount of water is taken off at the top of the column and is condensed, and from 5 to 10% of the condensate is introduced as a reflux into the column. An essential feature of the invention is that the bottom of the column is maintained at from 125° to 145° C., in particular from 130° to 140° C. Advantageously, the column is therefore equipped with a circulating cyclone evaporator. A mixture of caprolactam and acetic acid or propionic acid together with a small amount of water is thus obtained at the bottom, a typical mixture containing, for example, from 92 to 98% by weight of caprolactam, from 2 to 8% by weight of water and from 0.1 to 0.5% by weight of acetic acid or propionic acid. By maintaining a selected constant temperature at the bottom of the column, the composition of the bottom product can be kept constant. This is important because this mixture is recycled to the top of the tubular reactor, and hence ensures a constant composition of the polymerizing caprolactam melt. The mixture obtained at the bottom of the column is of course recycled to the top of the tubular reactor at about the rate at which it is produced.

The polycaprolactam obtained by the process of the invention is suitable for the production of moldings, filaments or fibers.

The Example which follows illustrates the process according to the invention.

EXAMPLE 756.5 kg/hour of fresh caprolactam, 136 kg/hour of an extraction liquor preconcentrated to 68.7% strength by weight and containing about 75% by weight of monomeric and about 25% by weight of oligomeric caprolactam (based on the content of caprolactam and oligomers), and 1,275 kg/hour of acetic acid are fed, in the form of a solution, into a precondensation tube which has a length of 18 m and a diameter of 1.6 m and is divided into four zones by three heat exchangers.

The tube is heated so that the topmost mechanically mixed zone is maintained at 257° C.

A vapor mixture comprising 82.8% of caprolactam, 16.9% of water and 0.28% of acetic acid is formed in the dome of the precondensation tube.

This mixture is fed to the middle of a packed column which has a length of 4.5 m and a diameter of 1 m, and the bottom of which is maintained at 133° C. by means of a circulating heater. The vapor which leaves the top of the column is condensed, and 28 kg/hour of condensate are obtained, containing 0.08 kg/hour of caprolactam; the condensate is free of acetic acid and thus contains about 99.7% of water. The condensate stream is divided by means of a flow-splitter so that 1.4 kg/hour are recycled to the column. A melt comprising 95% by weight of caprolactam, 4% by weight of water and 0.3% by weight of acetic acid is formed at the bottom of the column, and 189 kg/hour of this melt are recycled via a syphon to the top of the precondensation tube.

Polymerization is completed in the downstream zones at 265° C. and 250° C.

After a residence time of 18.6 hours, a polymer melt containing 11% of extractable constituents is discharged from the bottom of the precondensation tube using a spinning pump; the extracted melt has a relative solution viscosity of $2.51\eta$.

Filaments and fibers spun from the resulting polymer possess more uniform dyeability.

We claim:

1. An improved process for the continuous polymerization of $\epsilon$-caprolactam which comprises:

polymerizing partially an $\epsilon$-caprolactam composition at a nylon-forming temperature, in a mechanical mixing zone in a vertical tubular reactor through which the caprolactam composition flows downwardly, said composition comprising $\epsilon$-caprolactam, a water-containing agent, and acetic acid or propionic acid as chain regulator;

polymerizing further said composition in additional heat exchange zones in said reactor until polymerization is completed and thereupon discharging polycaprolactam from the reactor as a melt;

removing from the tubular reactor a vapor mixture of water, caprolactam, and acetic acid or propionic acid which has formed in the gas space at the top of the tubular reactor;

feeding the vapor mixture of caprolactam, water, and acetic acid or propionic acid to the middle of a fractionating column;

removing water from the top of said column;

maintaining the temperature at the bottom of said column at 125° C. to 145° C.; and recycling the mixture obtained at the bottom of the column to the top of the tubular reactor, said mixture comprising caprolactam, acetic acid or propionic acid, and a small amount of water;

whereby the polymerizing caprolactam composition and polycaprolactam melt maintain a constant composition.

2. A process as set forth in claim 1, wherein the bottom of the column is maintained at a selected constant temperature.

* * * * *